United States Patent [19]

Wagner et al.

[11] 4,263,335

[45] Apr. 21, 1981

[54] AIRLESS SPRAY METHOD FOR DEPOSITING ELECTROCONDUCTIVE TIN OXIDE COATINGS

[75] Inventors: William E. Wagner, Verona; James A. Davis, Apollo, both of Pa.

[73] Assignee: PPG Industries, Inc., Pittsburgh, Pa.

[21] Appl. No.: 78,999

[22] Filed: Sep. 26, 1979

Related U.S. Application Data

[63] Continuation-in-part of Ser. No. 928,112, Jul. 26, 1978, abandoned.

[51] Int. Cl.³ .................... C03C 17/25; B05D 1/04; B05D 5/12; G02B 1/10
[52] U.S. Cl. .................... 427/29; 427/110; 427/168; 427/427
[58] Field of Search ............. 427/29, 30, 110, 427, 427/168

[56] References Cited

U.S. PATENT DOCUMENTS

| | | | |
|---|---|---|---|
| 2,651,585 | 9/1953 | Lytle et al. | 427/110 |
| 3,107,177 | 10/1963 | Saunders et al. | 427/110 |
| 3,677,814 | 7/1972 | Gillery | 427/110 |
| 3,959,565 | 5/1976 | Jordan et al. | 427/110 |

OTHER PUBLICATIONS

Norden Corp., Technical Publications Manual 9-0, "Airless Electrostatic" Amherst, Ohio, 11-20-70.

Primary Examiner—James R. Hoffman
Attorney, Agent, or Firm—Donna L. Seidel

[57] ABSTRACT

Electroconductive tin oxide coatings are deposited by an airless method of spraying a liquid composition of a thermally decomposable tin compound onto a hot glass surface in order to prevent overspray of the liquid coating composition onto the opposite glass surface.

10 Claims, 1 Drawing Figure

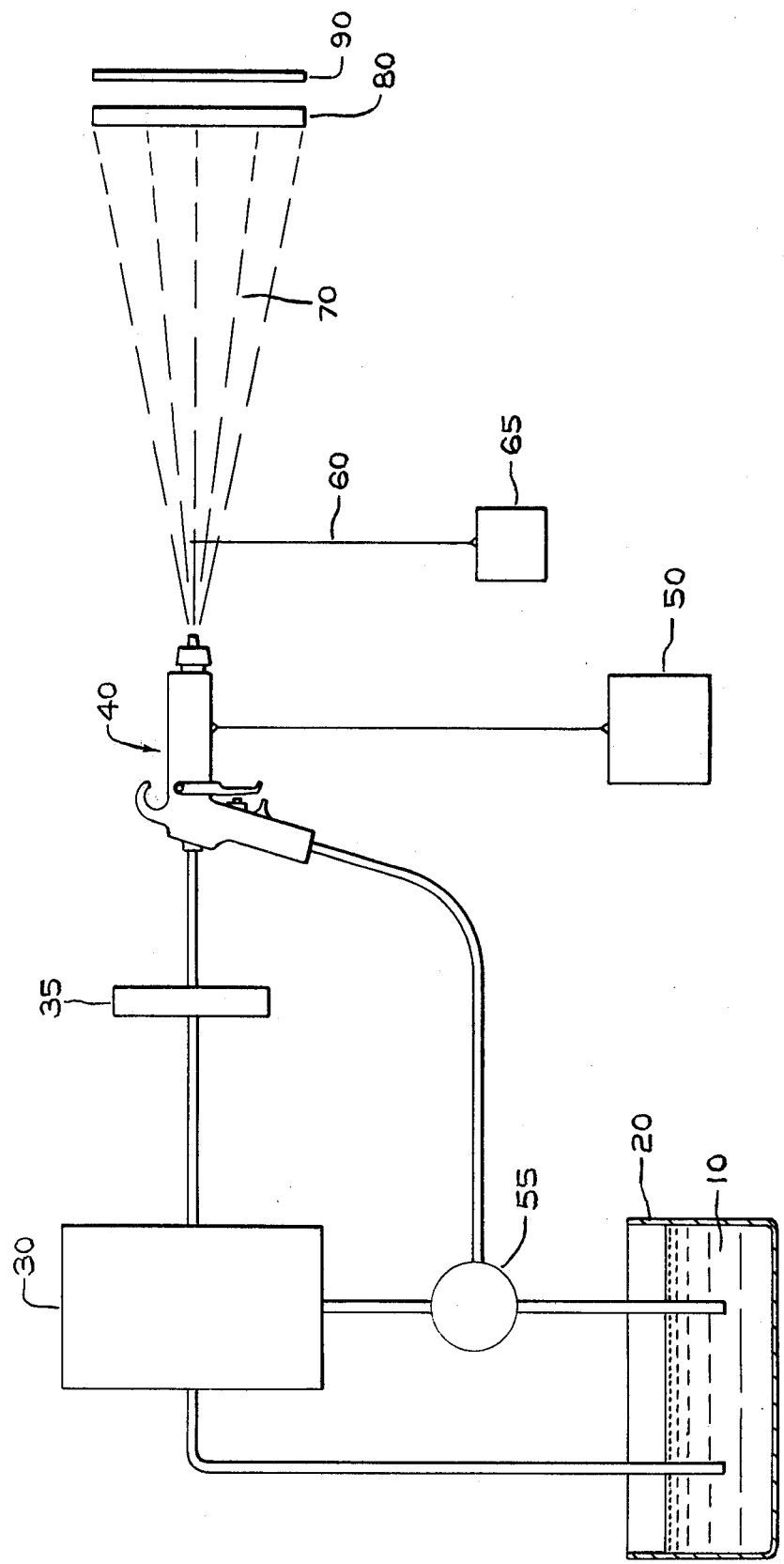

AIRLESS SPRAY METHOD FOR DEPOSITING ELECTROCONDUCTIVE TIN OXIDE COATINGS

CROSS-REFERENCE TO RELATED APPLICATIONS

This application is a continuation-in-part of U.S. Ser. No. 928,112 filed July 26, 1978 now abandoned by the same inventors.

FIELD OF THE INVENTION

The present invention relates generally to the art of spraying coating compositions onto refractory substrates and more particularly to the art of depositing transparent electroconductive metal oxide films by spraying a thermally decomposable metal compound onto a hot glass surface.

THE PRIOR ART

It is known that a transparent electroconductive film may be deposited on a refractory base such as glass by applying various thermally decomposable compounds of tin, both organic and inorganic, to a heated surface of the substrate.

In U.S. Pat. No. 3,107,177, Saunders et al disclose a family of filming compositions and novel filming techniques that produce tin oxide films having high transparency, high electroconductivity, good electrical contact with bus bars and substantially no haze. The techniques involve spraying a heated glass sheet surface using two separate spray guns, both set at 50 p.s.i. (pounds per square inch) atomizing air pressure, one dispensing an organic solution of an organic tin compound and the other dispensing an organic solution of a halogen compound such as hydrofluoric acid.

A problem encountered in prior art methods of depositing electroconductive coatings is that turbulence caused by the atomizing air results in overspray; i.e., deposition of electroconductive coating on the surface of the glass substrate opposite the surface toward which the coating composition is sprayed. The oversprayed perimeter of the back surface has a resistivity substantially the same as the front surface so that the oversprayed coating must be removed, typically by a costly blocking procedure, before the substrate can be used as a touch control panel or the like which would otherwise short-circuit. Even if electrostatic techniques are employed to improve process efficiency, a wraparound effect results in the deposition of some coating material on the back surface of the substrate.

SUMMARY OF THE INVENTION

The present invention provides a method for depositing electroconductive coatings on one surface of a nonmetallic substrate which reduces overspray thereby minimizing the need for removing oversprayed coating from the opposite surface. The method involves employing a spray technique which utilizes hydraulic pressure rather than atomizing air pressure to deliver the coating composition to the substrate in the form of a spray. The airless technique of the present invention using hydraulic pressure in the absence of atomizing air to form a spray, does not create the turbulence typical of air spray systems and thereby minimizes overspray. A further improvement in coating efficiency and uniformity may be made by combining the airless spray technique with electrostatic spraying techniques. The best mode of practicing the present invention involves the use of a grounded metal plate behind the substrate to be coated thereby eliminating overspray and wraparound effects.

BRIEF DESCRIPTION OF THE DRAWING

In the FIGURE, a coating solution 10 maintained in a reservoir 20 is delivered by a pump 30 through an optional filter 35 to an electrostatic spray gun 40 attached to a power pack 50. A circulating valve 55 maintains solution flow through the system. A wire 60 charged by a voltage source 65 extends into the spray of coating solution 70. The substrate to be coated 80, supported in a vertical position by a grounded support (not shown), is preferably backed by a grounded metal plate 90.

DESCRIPTION OF THE PREFERRED EMBODIMENT

A solution of a thermally decomposable organic tin compound is preferably maintained at ambient temperature and delivered to a surface of a nonmetallic substrate, such as ceramic, glass or other refractory material. The organic tin compound may be applied to a substrate which is subsequently heated to decompose the organic tin compound to tin oxide, but preferably the organic tin compound is applied to a substrate maintained at a temperature sufficient to decompose the organic tin compound to tin oxide on contact. A preferred substrate is a glass sheet maintained at a temperature of at least about 400° F. (about 204° C.), but below the temperature at which the substrate become unstable, preferably from about 950° to 1400° F. (about 510° to 760° C.).

Preferred filming compositions and techniques that produce tin oxide films having high transparency and electroconductivity are disclosed in U.S. Pat. No. 3,107,177 which disclosure is incorporated herein by reference. Useful tin compounds include dibutyl tin diacetate, dibutyl tin oxide, tributyl tin oxide, dibutyl tin dilaurate, tributyl tin acetate, dibutyl tin maleate, dibutyl tin di-2-ethyl hexoate, hydrazium trifluoro stannite, stannous acetate, stannous octoate, di-n-octyl tin dichloride, tributyl tin chloride, stannous pyrophosphate, triphenyl tin chloride, tributyl tin pentachlorophenate, phenyl tin oxide, dilauryl tin dichloride, butyl stannonium diacetate, tributyl tin dodecyl succinate, dimethyl tin dichloride, tetrabutyl tin and others, including tetraphenyl tin and triethyl tin hydroxide which are less preferred due to toxicity. Preferred compositions further comprise a halogen-containing compound, preferably both a fluorine-containing compound and a chlorine-containing compound. Other preferred filming compositions are disclosed in U.S. Pat. No. 3,677,814 to Gillery which disclosure is incorporated herein by reference. These compositions comprise a halogen-containing organic tin compound, preferably organic tin fluorides having a direct tin-fluoride bond. The organic moiety preferably comprises about 10 carbon atoms or less and may be aryl or alkyl, preferably alkyl with 1 to 6 carbon atoms.

It may not be presumed that if a coating is conductive, the coating solution is easily chargeable. Many of the organic coating solutions of the prior art are not readily chargeable for electrostatic deposition. The electrically nonconductive coating solutions of the present invention are formulated to be readily chargeable by the inclusion of a polar solvent such as methanol.

The coating solution is delivered to the hot glass surface by means of an airless spray system utilizing hydraulic pressure of about 400 to 1500 p.s.i. to produce a uniform, well-defined spray pattern from an airless spray gun. The use of an airless system improves coating efficiency, reduces air pollution and abates overspray. Further improvement in the coating method is preferably accomplished by combining the airless spray elevated temperatures. The glass substrate is preferably supported in a vertical position by metal tongs or other support means which are grounded. A charge is placed on the coating solution which is then attracted to the glass surface by electrical forces as well as being directed toward the glass surface by the hydraulic atomizing pressure which dissipates rapidly.

While the airless spray system is abating overspray due to the physical phenomenon of turbulence, the introduction of electrical forces may cause some deposition of coating material on the back surface of the glass akin to overspray due to the electrostatic phenomenon referred to as wraparound, i.e., charged particles of coating solution are electrically attracted to the back surface of the substrate as well as the front. In a most preferred embodiment of the present invention, the wraparound effect is eliminated by positioning a grounded metal plate behind the glass substrate to be coated. Any charged particles of coating solution not deposited on the front surface of the glass substrate are preferentially attracted to the grounded metal backup plate rather than to the back surface of the glass substrate. In this preferred embodiment there is essentially no deposition of coating material on the back surface of the glass substrate either by overspray or wraparound. The invention will be further understood from the descriptions of specific examples which follow:

EXAMPLE I

A coating solution is prepared by mixing 18.9 liters of dibutyl tin diacetate, 14.4 liters of triethylamine and 15.8 liters of a 30 percent solution of hydrofluoric acid in methanol. This solution is pumped at 40 p.s.i. by a Nordson Dual Piston Pump (Model AP) to a Nordson Model 1×E9A airless spray gun manufactured by Nordson Corp., Amherst, Ohio, resulting in 640 p.s.i. at the spray gun nozzle. No atomizing air is introduced into the spray system and a uniform airless spray pattern is produced. A clear glass sheet measuring 8×16×3/16 inches (203×406×4.8 mm) is maintained at a temperature between 1180° and 1280° F. (about 638° to 693° C.) while the front surface is contacted with the airless spray of the above coating solution for several seconds resulting in the deposition of a uniform tin oxide coating with a resistivity of 15 to 20 ohms per square. The back surface perimeter has a resistivity of 500 to 1000 ohms per square compared to a resistivity of 15 to 20 ohms per square for the oversprayed area produced by an atomizing air spray technique. The coated sheet is useful as an oven door.

EXAMPLE II

A coating solution is prepared by dissolving 1702.5 grams of dibutyl tin difluoride in 2150 milliliters of methanol and 1150 milliliters of triethylamine. The solution is pumped at about 40 p.s.i. to the spray gun resulting in about 640 p.s.i. at the spray gun nozzle. No atomizing air is introduced into the spray system. A uniform airless spray pattern is produced using the equipment described in Example I. Clear glass sheets are coated as in the previous example with significantly less overspray than is produced by an air atomization technique. The coated sheets have front surface resistivities of from 15 to 20 ohms per square.

EXAMPLE III

A coating solution is prepared by mixing 13,878 milliliters of dibutyl tin diacetate, 10,093 milliliters of methanol, 8,410 milliliters of triethylamine and 7,570 milliliters of 30 percent hydrofluoric acid in methanol and delivered to the airless spray gun as in the previous examples. The gun is positioned 15 to 17 inches from the front surface of a glass sheet which is heated at 1190° F. (about 649° C.). A charge wire is placed 2 to 2½ inches from the spray gun nozzle to provide an electrostatic charge of 40 kilovolts. The charged coating solution deposits a uniform tin oxide film on the glass surface with no texture or haze and a resistivity of 55 to 57 ohms per square. The perimeter of the back surface has a resistivity of 200 to 500 ohms per square.

EXAMPLE IV

A coating solution is prepared and applied as in the previous example except that a grounded metal plate is placed 1 inch from the back surface of the glass substrate. A uniform tin oxide film having a resistivity of about 55–57 ohms per square is deposited on the front surface. Essentially no tin oxide is deposited on the back surface which has a resistivity greater than $10^9$ ohms per square.

The front and back surface resistivities for the previous examples are compared in the following table:

TABLE 1

Front and Back Surface Resistivities of Tin Oxide Coated Glass Substrates

| Examples | Coating Technique | Front Surface Resistivity (OHMS/SQUARE) | Back Surface Perimeter Resistivity (OHMS/SQUARE) |
|---|---|---|---|
| I | Air Spray | 15–20 | 15–20 |
| I | Airless | 15–20 | 500–1000 |
| III | Airless Electrostatic | 55–57 | 200–500 |
| IV | Airless Electrostatic with grounded metal backup plate | 55–57 | $10^9$ |

The above examples are offered to illustrate the present invention. Variations and modifications may be practiced by those skilled in the art. For example, other nonmetallic substrates may be coated by airless spray techniques, such as plastics which are thermally stable at temperatures sufficient to decompose organic tin compounds to tin oxide. Other coating compositions may be used as well as other temperatures and pressures. When using the electrostatic techniques of the present invention, other nonmetallic substrates which can be charged relative to the coating solution and other means for charging the coating compositions can be employed. Such variations and modifications are included within the scope of the invention as defined by the following claims.

We claim:

1. In a method for forming a film on a nonmetallic substrate by thermal decomposition of a metal-containing coating reactant, a solution of which is sprayed onto a primary surface at a temperature sufficient to thermally decompose the coating reactant, the improvement which comprises:

spraying the coating solution in the absence of atomizing air using hydraulic pressure to form a spray.

2. The improved method according to claim 1, wherein the substrate is glass and the coating solution comprises an organic tin compound which thermally decomposes to form an electroconductive tin oxide film.

3. The improved method according to claim 2, wherein the solution is delivered through a spray nozzle wherein the pressure is from 400 to 1500 p.s.i.

4. The improved method according to claim 3, wherein the coating solution comprises an organic tin compound and an ionizable fluorine containing compound at a pH between 4.5 and 7.

5. The improved method according to claim 4, wherein the coating solution comprises an organic tin fluoride.

6. The improved method according to any one of claims 2, 3, 4 or 5 wherein the glass substrate is maintained at a temperature at which the glass surface is conductive and the coating solution is electrostatically charged.

7. The improved method according to claim 6, wherein the coating solution further comprises a polar solvent.

8. The improved method according to claim 7, wherein a grounded metal plate is placed behind the glass substrate spaced from the surface opposite the primary surface being coated.

9. A method for depositing an electroconductive tin oxide coating onto a glass substrate comprising the steps of:

a. preparing an electrically nonconductive coating solution comprising a thermally decomposable tin compound and a polar solvent;
b. atomizing said solution by means of hydraulic pressure;
c. placing an electrostatic charge on said solution;
d. heating a glass substrate to a temperature sufficient to thermally decompose the tin compound;
e. placing a grounded metal plate in substantially parallel facing spaced relationship from one primary surface of the glass substrate; and
f. applying said atomized coating solution to the primary surface of said heated glass substrate opposite the surface facing said grounded metal plate.

10. The method according to claim 9 wherein said coating solution comprises an organic tin compound, an ionizable fluorine-containing compound and methanol.

* * * * *